United States Patent

Pryor et al.

[15] 3,670,085

[45] June 13, 1972

[54] INJECTABLE THERAPEUTIC TETRAMISOLE FORMULATIONS

[72] Inventors: David Ernest Pryor, Balwyn, Victoria; Bruce Adam Forsyth, Croydon, Victoria, both of Australia

[73] Assignee: Imperial Chemical Industries of Australlia and New Zealand Limited, Melbourne, Victoria, Australia

[22] Filed: July 13, 1970

[21] Appl. No.: 54,641

[30] Foreign Application Priority Data

July 12, 1969 Australia ...........................58312/69

[52] U.S. Cl............................................................424/270
[51] Int. Cl. .......................................................A61k 27/00
[58] Field of Search..................................................424/270

[56] References Cited

OTHER PUBLICATIONS

Merck Index, Eighth Edit. (1968) page 1,029.

*Primary Examiner*—Sam Rosen
*Attorney*—Cushman, Darby & Cushman

[57] ABSTRACT

Aqueous injectable solutions of tetramisole comprising tetramisole acetate or hydrochloride equivalent to at least 6 percent w/v of L-tetramisole base and from 0.1 to 0.5 inclusive mole per liter of solution of a sodium salt of citric, tartaric or phosphoric acid, the pH of the solution being adjusted to the range of from 2 to 4 by addition of tartaric, citric or phosphoric acid.

2 Claims, No Drawings

INJECTABLE THERAPEUTIC TETRAMISOLE FORMULATIONS

This invention relates to new formulations of tetramisole; in particular it relates to formulations which are suitable for administration by injection into warm-blooded animals, e.g. cattle, pigs, sheep or fowl. It is known from British Pat. No. 1,043,489 — Janssen Pharmaceutica N.V. that D,L-2,3,5,6-tetrahydro-6-phenylimidazo-(2,1-b)-thiazole (for convenience hereinafter referred to as D,L-tetramisole) and its therapeutically acceptable acid addition salts are potent anthelmintic agents. The said British Pat. specification No. 1,043,489 enumerates many acid addition salts of D,L-tetramisole derived from common organic and inorganic acids. It is also known that laevorotatory tetramisole, hereinafter referred to as L-tetramisole, is approximately twice as active as D,L-tetramisole as an anthelmintic agent, i.e. that L-tetramisole is responsible for all or most of the anthelmintic activity, at least in ruminants such as sheep or cattle. In our Australian Pat. application No. 32285/68 we have disclosed and claimed a process for preparing L-tetramisole in highly pure form. Since the mammalian tolerance to dextrorotatory tetramisole (hereinafter referred to as D-tetramisole) is approximately equal to the tolerance of L-tetramisole, the manufacture of pure L-tetramisole made it possible to substantially reduce the risk of toxic reaction in the host animal. Although the D,L-tetramisole racemate itself has a wide safety margin for most species, the practically doubled safety margin of the L-isomer has great value when it is administered under varying control in the field, particularly under the extremes of conditions of sheep- and cattle-farming in the Australian outback or in the open ranges in the U.S.A., where prolonged drought may unpredictably reduce the resistance of individual animals. Furthermore, preparation of pure L-tetramisole facilitated administration by subcutaneous injection since lower dosages are required.

In spite of the fact that tetramisole can be administered "per os," administration by injection is a desireable objective. Cattle, particularly wild range cattle, resist the administration of drugs "per os" and complex harnessing equipment is required for satisfactory handling. The administration of the drug to cattle by injection is far simpler, permits the dosing of many more animals per unit of time and involves far less risk to man and animal; even with sheep, pigs or poultry, injection is at times preferable. However, the administration of tetramisole solutions by injection has not proved entirely satisfactory. With cattle the therapeutic dose injected is proportional to body weight and therefore relatively large. A very small proportion of the animals exhibits sensitivity and even undesirable pathological reactions at the site of injection varying from mild irritation to the formation of lumps, which may range in diameter from several millimeters up to several centimeters.

Although the statistical incidence of this phenomenon is extremely low it has up to date prevented the adoption of administration by injection in many areas and the elimination of this phenomenon remains therefore highly desirable. In the widespread application of tetramisole in many countries, almost universally, its halide, particularly its chloride salts have been used for aqueous formulations, mostly with small additions of phosphate or citrate buffer usually less than 0.03 mole/liter to control the pH to somewhat less than the natural pH of the hydrochloride, which is about 4. This pH adjustment has been made solely for the purpose of improving the storage stability of the solutions, since tetramisole undergoes base-catalysed hydrolysis to an inactive derivative.

The pathological sensitivity observed with certain animals after injection of the hydrochloride has hitherto been ascribed to idiosyncratic reactions to the organic tetramisole molecule,e.g. irritancy or histaminic releases.

We have now found that the requirements for therapeutic acceptability of tetramisole salts for injection differs from those for administration "per os." In particular we have discovered that the nature and concentration of other cations present in the solution affects the living tissue to varying degrees. While we do not wish to be limited by theory we consider that osmotic and/or electro-osmotic effects in certain sensitive animals can provide the driving force to damage in the cell walls and that this can be remedied by the addition of suitable amounts of certain additives, described hereinafter.

We have found furthermore that a measure of the therapeutic acceptability for injections of aqueous tetramisole addition salt solutions can be obtained by a simple haemolysis test. When one of the tetramisole salts which is less acceptable for subcutaneous injection is mixed with bovine blood under standard conditions, a proportion of the red blood cells undergoes haemolysis, and blood serum becomes colored to a degree varying with the degree of haemolysis. No or very little such haemolysis is observed with salts which have been rendered acceptable for injection by the addition of suitable amounts of the additives according to this invention. If the red blood cells are then removed by centrifugation of the solution, the residual color of the blood serum is a quantitative measure of the haemolysis. While we do not know whether some haemolysis may occur in vivo in the tissue of the animal or whether haemolysis in blood exhibited in the in vitro test is merely a phenomenon correlated to the damage of tissue in vivo, we have found that the degree of haemolysis is correlated significantly with the occurrence of sensitivity to injections in those live animals which exhibit sensitivity to tetramisole hydrochloride injections.

We have found that the acceptability of aqueous solutions of tetramisole addition salts for injections can be substantially improved when suitable, fairly large amounts of therapeutically acceptable water soluble salts, particularly sodium salts are added to the solution of anthelmintic tetramisole salts and that the solutions so prepared are highly effective.

Accordingly we provide an aqueous solution comprising firstly a tetramisole salt equivalent to at least 6 percent w/v of L-tetramisole base and secondly 0.1 to 0.5 inclusive mole, preferably 0.15 to 0.5 mole inclusive of a biologically acceptable, non-toxic, water soluble salt per liter of solution characterized in that said solution when mixed with bovine blood and subjected to the haemolysis test hereinafter defined, does not produce haemolysis to an extent exceeding the rating S of said haemolysis test. The haemolysis test is defined as follows:

Haemolysis Test

The test is carried out on heparinised venous blood drawn either from individual animals or, preferably, on a bulked representative sample from a number of the animals to be subsequently injected.

Procedure

Into a series of centrifuge tubes of at least 10 cc capacity, pipette 2 mls of the aqueous solution of the tetramisole salt to be tested, add quickly with agitation 4 ml of whole heparinised venous blood and place the centrifuge tube in a water-bath at 38° C for 20 minutes. Immediately centrifuge at a force at least 1,500 G s to throw down the red cells and compare the color of the supernatant plasma with a series of standards prepared as follows:

Solution 1

Prepare a batch of bovine serum preferably from the same blood by centrifuging unhaemolysed blood as described above.

Solution 2

Prepare haemolysed blood by diluting 4 vols of blood with 2 vols of 15 percent w/v tetramisole hydrochloride. Hold at 38° C for 20 minutes.

Prepare standards by mixing solutions 1 and 2 in the ratios shown below.

A rating of zero corresponds to no haemolysis, and S to negligible effect; these ratings characterize the present invention. Ratings from 1 to 10 express varying degrees of haemolysis up to fully haemolysed blood and are characteristic of the less acceptable formulations of the prior art.

The addition of the salts defined above, especially of sodium salts, may be used to render the less preferred prior art tetramisole solutions, e.g. tetramisole hydrochloride or tetramisole acetate solutions, more acceptable; they also pro-

| Haemolysis Rating | | Mixture | |
|---|---|---|---|
| | | mls soln. 1 | mls soln. 2 |
| 0 | acceptable | 10 | 0 |
| S | | 9.95 | 0.05 |
| 1 | | 9.9 | 0.1 |
| 2 | | 9.75 | 0.25 |
| 3 | | 9.0 | 1.0 |
| 4 | not acceptable | 7.5 | 2.5 |
| 5 | | 6.0 | 4.0 |
| 6 | | 4.5 | 5.5 |
| 7 | | 3.0 | 7.0 |
| 8 | | 1.5 | 8.5 |
| 9 | | 0.5 | 9.5 |
| 10 | | 0 | 10 | vide yet a further, marginal but valuable improvement in the formulations of the tetramisole salts, which are preferred for injections in accordance with our copending application of even date, such as tetramisole citrate, tartrate or phosphate. Suitable sodium salts are the salts of the anions which meet the haemolysis test, e.g. sodium sulphate and particularly sodium citrate, sodium tartrate and sodium phosphate; sodium dihydrogen phosphate is most preferred. Other, less preferred salts are the magnesium and, in the low regions which are biologically permissible, potassium salts. The monosodium salt is used usually although from the point of view of therapeutic and biological acceptability the more alkaline salts are not unsuitable; however, they are not practical because of storage requirements in view of the hydrolytic instability of tetramisole discussed above. Mixtures of suitable and compatible salts as defined may also be used.

Accordingly we provide an aqueous injectable solution comprising a tetramisole salt in a concentration equivalent to at least 6 percent w/v of free tetramisole base and, in addition, from 0.1 to 0.5 inclusive mole, preferably from 0.15 to 0.5 inclusive mole, of a water soluble sodium salt per liter of solution.

It should be noted that the addition of small amounts of sodium buffers such as sodium dihydrogen phosphate has long been practised in the art, but that the concentrations used,usually less than 0.03 mole/liter were much smaller than we are proposing now, that the function of these prior art additives was entirely control of the pH and that at these low concentrations they did not effect improved therapeutic acceptability for injections.

Because L-tetramisole is therapeutically more acceptable than the racemate and is a more concentrated form of the active ingredient it can be administered in smaller amounts of injected fluid; our preferred salts are therefore based on L-tetramisole rather than the racemate, but salts of the latter are included.

Whenever, as the result of the choice of a particular tetramisole salt or a particular sodium salt, the pH exceeds the optimum 4 the pH may be adjusted by the addition of an acid having a therapeutically acceptable anion, e.g. phosphoric, tartaric or citric acid.

Accordingly we provide formulations as defined above wherein the pH is adjusted to the range from 2 to 4 by the addition of tartaric, citric or phosphoric acid.

We also provide a method of combating helminthiasis in a warm-blooded animal which comprises injecting said animal with anyone of the tetramisole solutions hereinbefore defined.

Our invention is now exemplified by,but not limited to the following examples, in which all proportions are given as the weight volume equivalent to free tetramisole base, unless otherwise stated.

Examples 1 to 3 inclusive

Sterile aqueous solutions, suitable for injection were prepared from various tetramisole salt solutions at various concentrations as stated in Tables 1 and 2. In addition to these salts the following compounds, which have been conventionally used in the prior art tetramisole formulations were added: 2 g sodium metabisulphite 0.5 g methyl para-oxybenzoate, 0.05 g propyl para-oxybenzoate per 1,000 mls of water.

From several large herds cattle were selected which, during earlier trails, had shown sensitivity to tetramisole hydrochloride injections. This selection was necessary because the vast majority of animals shows no unfavorable reaction whatever to the injection of tetramisole and the incidence of sensitivity among normal cattle is so extremely low that very large numbers of cattle would need to be treated before any significant trends in irritation can be detected. It is known that quite generally the sensitivity to injections of any drug varies between animals and, even for a given animal, varies from site to site of injection; to eliminate or minimize these side effects different treatments were randomized over sites as well as animals, using pairing of identical left and right side sites as much as possible for randomization. The sterile formulations were injected subcutaneously and the hair was shaved off the injection sites to facilitate observation.

Assessments of the tissue reaction, if any, at the site of injection were made regularly for a period of up to 14 days. The type of reaction at each site was rated as follows:

| | |
|---|---|
| 0 | No reaction |
| 1 | Mild skin thickening and slight swelling of the subcutaneous tissues, lower limit of detectability by palpation only. |
| 2 | Similar to rate 1 but slightly more extensive. |
| 4 | Swelling up to about 2'' diameter visible, slightly raised above the body surface. |
| 8 | Large swelling up to 4'' in diameter and raised about ¼ to 1'' above body level. |
| 16 | Larger swelling than 8 |

The exponential increase in the rating values takes into account the increasing extent of the irritation. Ratings 0 to 4 inclusive, without shaving off the hair, would pass unnoticed in practice but ratings 8 and above are noticeable and are undesirable; rating 16 is unacceptable Because a large number of treatments at one time cannot be satisfactorily paired and randomized with a manageable number of animals, and also to obtain an indication of random variation due to climatic, biological (age, physical conditions, sex) and other chance factors, several blocks of experiments were carried out and are reported here in separate tables. The sum of the ratings of the animals in each group (total rating) divided by the number of animals gave the parameter rate/beast, which is an inverse expression of the acceptability of the injectable formulation. Rates below 4.0 are satisfactory, below 2.0 good, and below 1.5 excellent. All figures given in the tables were statistically significant at the 1 in 100 level or better. In experiment 1 to 3, three formulations of a prior art L-tetramisole salt, L-tetramisole hydrochloride, were prepared and tested by injection into the preselected test animals. Since, at its conventional concentration (6.38 percent w/v expressed as free base), even with selected, sensitive test animals the incidence of irritation is too rare to be demonstrated in anything but very large scale trials, the concentration of L-tetramisole hydrochloride was increased by 30 percent relatively to 8.5 percent w/v free base to increase sensitivity. This solution A was used as control (prior art); an amount of sodium dihydrogen citrate (0.072 mole) equivalent to more than double the usual amount of buffer was added as a buffer in solution B (also control, prior art); this amount is more than the maximum one would conceive if buffer action is the objective; finally a solution according to the present invention was prepared by adding a much larger amount, 0.290 mole, of mono-sodium dihydrogen citrate. These three formulations were injected into 24 animals (each with two identical, right and left side injection sites) according to a statistical design distributing the three treatments to blocks of eight animals in pairs over the identical right and left side sites on each animal, so that 16 injections were used for each treatment. In this manner chance effects were minimized by randomization and by pairing over identical sites. Results are summarized in Table 1. Differences between rates/beast were statistically significant at the 1 in 100 level.

from the low rates/beast observed. These examples are representative of the reaction of normal cattle under field conditions.

TABLE 1.—SITE 1

| Experiment number | Formulation | Rating | | | | | Number of beasts | Total rating | Rate/ beast | Relative rate/ beast |
|---|---|---|---|---|---|---|---|---|---|---|
| | | 16 | 8 | 4 | 2 | 1 | 0 | | | |
| 1 | Solution A | | 2 | 7 | 5 | 0 | 2 | 16 | 54 | 3.4 | 6.8 |
| 2 | Solution B | | 2 | 3 | 3 | 2 | 6 | 16 | 36 | 2.3 | 4.6 |
| 3 | Solution C | | | | 1 | 6 | 10 | 16 | 8 | 0.5 | 1 |

| Solution | L-tetramisole salt | | Additive |
|---|---|---|---|
| A | L-tetramisole hydrochloride. | 8.5% w./v. expressed as free base=0.415 mole. | Nil. |
| B | do | do | Plus 1.55% w./v. (monosodium) dihydrogen citrate (=0.0725 mole). |
| C | do | do | Plus 6.2% w./v. (monosodium) dihydrogen citrate (=0.290 mole). |

Experiment 4 to 6 inclusive

Experiments 1 to 3 were repeated on a smaller group of cattle (21) using a similar statistical design (14 treatments per solution). In addition the above described haemolysis test was carried out on solution A, B and C to determine its correlation with the acceptability of the solutions. Results are given in Table 2.

TABLE 2

| Experiment Number | Formulation | Rating | | | | | Number of beasts | Total rating | Rate/ beast | Haemolysis test rating |
|---|---|---|---|---|---|---|---|---|---|---|
| | | 16 | 8 | 4 | 2 | 1 | 0 | | | |
| 4 | Solution A | 2 | 6 | 6 | 0 | 0 | 0 | 14 | 104 | 7.4 | 9 to 10 |
| 5 | Solution B | 1 | 1 | 6 | 4 | 1 | 1 | 14 | 57 | 4.1 | 4 |
| 6 | Solution C | | | 1 | 3 | 4 | 6 | 14 | 14 | 1 | 0 |

A statistical evaluation of the results summarized in Tables 1, 2 and 3 found that the haemolysis test ratings gave results compatible with the ratings found in actual animal trials based on this series.

Examples 7 to 9 inclusive

A further series of injections was carried out as described in Examples 1 to 3, but instead of an L-tetramisole salt according to the prior art a preferred L-tetramisole salt according to our copending application of even date, namely the dihydrogenphosphate was used, together with sodium salts according to this invention. Exp. 7 is a Control without the sodium salt.

Results given in Table 3 show that a further highly desirable repression of the irritation Rate/beast was attained.

TABLE 3

| Example Number | L-Tetramisole salt | Concentration (expressed as percent w./v. free base) | Additive and concentration, percent w./v. | Number of beasts | Rate/ beast |
|---|---|---|---|---|---|
| 7 | Dihydrogen phosphate | 15.3 (0.75 mol) | Nil=Control | 24 | 1.83 |
| 8 | do | 15.3 (0.75 mol) | Na$_2$SO$_4$, 1.5% (=0.11 mol) | 19 | 1.0 |
| 9 | do | 15.3 (0.75 mol) | NaH$_2$PO$_4$·2H$_2$O, 3.3% (=0.21 mol) | 19 | 0.63 |

Examples 10 and 11

The test animals of experiment 1 to 9 which had been selected because of their higher sensitivity were replaced by a normal herd. These animals were injected with tetramisole salt solutions as described in Examples 1 to 3, using the concentrations stated in Table 4. The complete suppression of irritation, tantamount to freedom from undesirable reaction is apparent

TABLE 4

| Example Number | Formulation | Concentration (expressed as percent w./v. free base) | Number of beasts | Rate/ beast |
|---|---|---|---|---|
| 10 | L-tetramisole dihydrogen phosphate. | 12.75 | 94 | 0.18 |
| 11 | L-tetramisole dihydrogen phosphate + 2.0% w./v. NaH$_2$PO$_4$ (0.167 mol) | 12.75 | 94 | 0.03 |

Examples 12 and 13

A further series of tests were carried out with a normal herd as described in Examples 10 and 11 using high concentrations of both tetramisole salt and sodium salt. Results in Table 5 show excellent acceptability in all instances.

TABLE 5

| Example Number | Formulation | Tetramisole concentration [1] | Number of beasts | Rate/ beast |
|---|---|---|---|---|
| 12 | L-tetramisole dihydrogen phosphate +2.54% w./v. NaH$_2$PO$_4$ (0.212 mole) | 15.3 | 40 | 0.5 |
| 13 | L-tetramisole dihydrogen phosphate +5.08% w./v. NaH$_2$PO$_4$ (0.424 mole) | 30.6 | 40 | 0.7 |

[1] Expressed as percent w./v. free base.

Example 14

The procedure of Example 12 was repeated on 12 beasts but the additive of that example was replaced by 0.212 mole of monosodium dihydrogen citrate and the pH of the formulation was adjusted to pH 3.5 by the addition of phosphoric acid. The rate per beast was 2.3.

Example 15

The procedure of Example 12 was repeated on 12 beasts but the formulation of that example was replaced by L-tetramisole citrate having a tetramisole concentration of 15.3 percent w/v expressed as free base plus 3.3 percent w/v Na H$_2$PO$_4$ 2H$_2$O (0.212 mole). The pH of the formulation was adjusted to 3.5 by the addition of citric acid. The rate per beast was 3.9.

Example 16

The procedure of Example 15 was repeated but the L-tetramisole citrate in the formulation of that example was replaced by L-tetramisole tartrate having a tetramisole concentration of 15.3 percent w/v expressed as free base. The pH of the formulation was adjusted to 3.5 by the addition of tartaric acid. The rate per beast was 2.7.

We claim:

1. An aqueous solution which is therapeutically acceptable to warm blooded animals by injection, said solution comprising tetramisole acetate or hydrochloride equivalent to at least 6 percent w/v of L-tetramisole base, and from 0.1 to 0.5 inclusive mole, per liter of solution of a sodium salt of citric, tartaric or phosphoric acids, the pH of the solution being adjusted to the range of from 2 to 4 by addition of tartaric, citric or phosphoric acid.

2. A method of combating helminthiasis in a warm blooded animal which method comprises injecting said animal with an effect amount of a solution according to claim 1.

* * * * *

UNITED STATES PATENT OFFICE
CERTIFICATE OF CORRECTION

Patent No. 3,670,085    Dated June 13, 1972

Inventor(s) David Ernest Pryor and Bruce Adam Forsyth

It is certified that error appears in the above-identified patent and that said Letters Patent are hereby corrected as shown below:

(1) In the Heading, the priority date of July 12, 1969 should be corrected to read July 21, 1969.

(2) Claim 2, line 3, "effect" should read "effective".

Signed and sealed this 10th day of October 1972.

(SEAL)
Attest:

EDWARD M. FLETCHER, JR.
Attesting Officer

ROBERT GOTTSCHALK
Commissioner of Patents